US010737684B2

(12) United States Patent
Schlumpp et al.

(10) Patent No.: US 10,737,684 B2
(45) Date of Patent: Aug. 11, 2020

(54) METHOD FOR OPERATING A MOTOR VEHICLE, CONTROL UNIT FOR A DRIVE SYSTEM, AND DRIVE SYSTEM

(71) Applicant: Robert Bosch GmbH, Stuttgart (DE)

(72) Inventors: Florian Schlumpp, Marbach (DE); Jens Ritzert, Gerlingen (DE); Tobias Radke, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/064,190

(22) PCT Filed: Dec. 23, 2016

(86) PCT No.: PCT/EP2016/082646
§ 371 (c)(1),
(2) Date: Jul. 27, 2018

(87) PCT Pub. No.: WO2017/109218
PCT Pub. Date: Jun. 29, 2017

(65) Prior Publication Data
US 2019/0001959 A1  Jan. 3, 2019

(30) Foreign Application Priority Data
Dec. 23, 2015  (DE) .................. 10 2015 226 614

(51) Int. Cl.
*B60W 20/13*  (2016.01)
*B60W 50/00*  (2006.01)
(Continued)

(52) U.S. Cl.
CPC ............... *B60W 20/13* (2016.01); *B60K 6/20* (2013.01); *B60W 20/12* (2016.01);
(Continued)

(58) Field of Classification Search
CPC ...... B60W 20/00; B60W 20/12; B60W 20/13; B60W 50/0097; B60W 2510/10;
(Continued)

(56) References Cited

U.S. PATENT DOCUMENTS 8,731,752 B2 * 5/2014 Yu .................... B60W 10/26
                                                      701/22
9,643,512 B2 * 5/2017 Soo ..................... B60L 11/1862
(Continued)

FOREIGN PATENT DOCUMENTS

DE    102013220935 A1   4/2015
EP       2620343 A2    7/2013
(Continued)

OTHER PUBLICATIONS

International Search Reported dated Mar. 31, 2017, issued in International Application No. PCT/EP2016/082646.

*Primary Examiner* — Mahmoud S Ismail
*Assistant Examiner* — Bakari Underwood
(74) *Attorney, Agent, or Firm* — Norton Rose Fulbright US LLP; Gerard Messina

(57) ABSTRACT

A method for operating a hybrid drive system for a motor vehicle having an internal combustion engine and an electrical drive, which is supplied by an electrical energy store, the required powers of the internal combustion engine and/or of the electrical drive being set in accordance with a specified load distribution, including: regulating the load distribution between the electrical drive and the internal combustion engine based on a current setpoint state of charge of the electrical energy store; and determining the current setpoint state of charge from a specified linear setpoint state of charge curve between a current position of the motor vehicle and a destination.

15 Claims, 3 Drawing Sheets

(51) Int. Cl.
*B60W 20/12* (2016.01)
*B60K 6/20* (2007.10)
*B60K 6/48* (2007.10)
*B60W 20/00* (2016.01)

(52) U.S. Cl.
CPC ......... *B60W 50/0097* (2013.01); *B60K 6/48* (2013.01); *B60W 20/00* (2013.01); *B60W 2510/244* (2013.01); *B60W 2520/10* (2013.01); *B60W 2555/40* (2020.02); *B60W 2556/50* (2020.02); *B60W 2710/244* (2013.01); *B60Y 2200/92* (2013.01); *Y02T 10/56* (2013.01); *Y02T 10/6221* (2013.01); *Y02T 10/84* (2013.01)

(58) Field of Classification Search
CPC ....... B60W 2510/13; B60W 2510/244; B60W 2710/244; B60K 6/20; B60K 6/48; B60Y 2200/92; Y02T 10/56; Y02T 10/84; Y02T 10/6221
USPC .......................................................... 701/22
See application file for complete search history.

(56) References Cited

U.S. PATENT DOCUMENTS

| | | | |
|---|---|---|---|
| 10,166,972 B2 * | 1/2019 | Fracchia | ................ B60K 6/448 |
| 2008/0021628 A1 * | 1/2008 | Tryon | ...................... B60K 6/46 |
| | | | 701/99 |
| 2009/0259355 A1 | 10/2009 | Li | |
| 2011/0166732 A1 | 7/2011 | Yu | |

FOREIGN PATENT DOCUMENTS

| | | |
|---|---|---|
| FR | 2980148 A1 | 3/2013 |
| FR | 2982802 A1 | 5/2013 |
| JP | 2007510567 A | 4/2007 |
| JP | 2009143524 A | 7/2009 |
| JP | 2010122117 A | 6/2010 |
| JP | 2010154638 A | 7/2010 |
| JP | 2012147554 A | 8/2012 |
| JP | 2015067052 A | 4/2015 |
| WO | 2012/085614 A1 | 6/2012 |

* cited by examiner

METHOD FOR OPERATING A MOTOR VEHICLE, CONTROL UNIT FOR A DRIVE SYSTEM, AND DRIVE SYSTEM

FIELD OF THE INVENTION

The present invention generally relates to a control method for energy management in hybrid drive systems. The present invention in particular relates to operating strategies for operating a vehicle by specifying a load distribution.

BACKGROUND INFORMATION

Conventional hybrid vehicles or hybrid electric vehicles (HEV) reclaim kinematic energy in electrical form while driving and store this energy in an electrical energy store such as e.g. a high-voltage (HV) battery, which may be achieved for example by recuperating energy while the vehicle is driving.

PHEV is characterized by the fact that it offers the possibility of charging the electrical energy store through an external power supply network. As a result, a drive system of a PHEV has two types of energy sources available for producing the required vehicle drive energy: namely, conventional fuel based on fossil energy sources for driving the internal combustion engine as well as electrical energy from the power supply network for driving an electrical drive.

In order to include this in calculating the $CO_2$ emissions of the vehicle, the EU defined a special certification prescription. It has furthermore become clear that in an PHEV the supply from an additional energy source increases the complexity of the control strategy for controlling the energy management that is to be used in a PHEV.

In a PHEV, an electrical energy store is used that has a comparatively high capacity in comparison with an electrical energy store that is installed in a conventional HEV. Hence it is possible to use for a PHEV a charge depleting/charge sustaining (CD/CS) strategy, in which the driving power of the PHEV is initially provided mainly by the electrical energy store until a lower state of charge (SoC) threshold is reached. The stored charge of the electrical energy store is then regulated so as to maintain the low state of charge reached so far. Alternatively, the vehicle may be operated in a mixed mode ("blended mode"), in which the state of charge is regulated in such a way that the available electrical energy is distributed more uniformly over the entire distance traveled.

Document DE 10 2013 220 935 A1 discusses a method for adapting an operating strategy in a hybrid electric vehicle, in which the adaptation of a predictive operating strategy occurs on the basis of ecological and/or economic features of the available energy forms for driving the HEV. For this purpose, the available energy forms are respectively assigned an equivalence factor for converting different forms of energy into one another.

The calculation of a setpoint curve that is as efficient and $CO_2$-economizing as possible normally requires a high computation expenditure for the control unit (ECU) of the vehicle. Therefore, there exist a need to improve and simplify the control strategy for operating the PHEV.

SUMMARY OF THE INVENTION

A method is provided for operating a vehicle, as described herein, a control unit for a plug-in hybrid electric vehicle, which has a prediction module for calculating a setpoint curve for a state of charge of a battery of the plug-in hybrid electric vehicle, as well as a plug-in hybrid electric vehicle, which has a control unit having a prediction module, according to the further descriptions herein.

Additional developments are specified in the further descriptions herein.

According to a first aspect, a method is provided for operating a hybrid drive system for a motor vehicle having an internal combustion engine and an electrical drive that is supplied by an electrical energy store. The required powers of the internal combustion engine and/or of the electrical drive are set in accordance with a specified load distribution. The method includes the following steps:

regulating the load distribution between the electrical drive and the internal combustion engine based on a current setpoint state of charge of the electrical energy store; and determining the current setpoint state of charge from a specified, in particular linear setpoint state of charge curve between a current position of the motor vehicle and a destination.

In particular, it is possible to repeat the method cyclically.

The above method substantially simplifies a prediction of the setpoint state of charge curve to be used. Many items of information, which enter into the calculation of the setpoint state of charge and which are typically ascertained predictively and are therefore used while encumbered with errors, may instead be ascertained without errors for the respectively current point in time, which may be achieved for example by vehicle sensors and navigation devices.

In particular, information that may be ascertained on site, which is obtainable comparatively simply for the current point in time, but which would be predictively determinable only at great expense, may be used quasi in real time. Furthermore, it is possible to increase the accuracy of the required setpoint state of charge curve in such a way that it is close to the optimized curve with respect to the $CO_2$ emission. At the same time, it is possible to reduce the demand for computing power of the control unit and/or the latter's computing power may be better utilized in comparison to the related art.

Since in this method a linear setpoint state of charge curve is chosen, the calculation may thereby be simplified further, it being at the same time possible to continue to ensure a high accuracy. This is in particular the case when a modification or an update of the setpoint state of charge curve is performed repeatedly or cyclically, for example at certain time or distance intervals while driving, and in this manner a corrected current setpoint state of charge is always supplied. The setpoint state of charge curve updated in this manner may also correspond to a linear curve, in the most simple case only the gradient of the setpoint state of charge curve being adapted.

According to another aspect, a control unit is provided for operating a hybrid drive system for a motor vehicle having an internal combustion engine and an electrical drive that is supplied by an electrical energy store. The required powers of the internal combustion engine and/or of the electrical drive may be set in accordance with a specified load distribution, the control unit being configured to:

regulate the load distribution between the electrical drive and the internal combustion engine based on a current setpoint state of charge of the electrical energy store; and determine the current setpoint state of charge from a specified linear setpoint state of charge curve between a current position of the motor vehicle and a destination.

According to another aspect, a control unit is provided for a motor vehicle having a hybrid drive system, which has a prediction module that is configured to calculate a setpoint state of charge curve of an electrical energy store of the motor vehicle. The control unit is configured to regulate a state of charge of the electrical energy store in accordance with the setpoint state of charge curve calculated by the prediction module. For the purpose of updating the calculated setpoint state of charge curve, the prediction module is also configured to modify the setpoint state of charge curve in response to receiving ascertained predictive information about a current state of the motor vehicle.

The sensor units used for ascertaining the information to be ascertained may be of different types and may include for example a navigation device, vehicle sensors, or the like.

This makes it possible in a simple manner to increase the energy efficiency of a motor vehicle, in which the required power is provided by an internal combustion engine and/or the electrical drive. Furthermore, the $CO_2$ consumption may thereby be reduced. This is in particular made possible by the fact that the setpoint state of charge curve is respectively updated based on information about a current state of the vehicle, that is, based on information that may be currently measured or received. It is thus not necessary to calculate the entire setpoint state of charge curve in advance. Instead, it is possible to adapt the setpoint curve successively.

According to one aspect of the present invention, a plug-in hybrid electric vehicle is furthermore provided, which has the above-mentioned control unit including a prediction module. The control unit is configured to regulate a setpoint state of charge of an electrical energy store of the motor vehicle so as to make it possible to implement the method of the present invention.

This makes it possible to implement and optimize the setpoint state of charge curve to be used on the basis of predictive information that is as simple to ascertain as possible. Thus it was possible to show that it is possible to achieve high fuel savings already with a very small predictive effort.

This is made possible in particular by the fact that not the entire setpoint state of charge curve is calculated already prior to/at the beginning of the drive. Instead, the setpoint state of charge is determined locally for the current point in time.

Consequently, it is possible to achieve a low error-proneness as well as a high $CO_2$-economization potential by a simple implementation of the above-mentioned aspects. It is possible in the process to determine a nearly optimal setpoint state of charge curve. This setpoint state of charge curve may correspond to the implementation of a "blended mode," whereby a clear reduction of the $CO_2$ emissions may be achieved.

It is possible to use the present invention in all common PHEVs. It improves the hybrid operating strategy and is able to make use of existing sources of information.

Furthermore, there may be a provision to ascertain information about a current state of the motor vehicle and to update the specified setpoint state of charge curve as a function of the ascertained information.

The method may in particular have the following additional steps:
ascertaining an energy differential of the motor vehicle between the current position of the motor vehicle and the destination from the ascertained information, and
calculating a correction value for a current setpoint state of charge based on the ascertained energy differential;
applying the correction value to the current setpoint state of charge.

The ascertained value for the energy differential provides a parameter that directly influences the energy management of the vehicle and thus represents a robust reference variable for the calculations in accordance with the method. For the correction value, it is possible to take into account vehicle-internal influencing factors such as for example an efficiency chain, which is determined for example by the architecture of the drive train of the vehicle.

In particular, it is possible to ascertain a current driving speed and/or a current elevation coordinate of the vehicle and/or an absolute elevation at the destination, and to ascertain a kinetic energy of the vehicle and/or a potential energy of the vehicle with respect to the destination.

Furthermore, it is possible to calculate an expected recuperation energy based on an ascertained positive energy differential of the vehicle with respect to the destination, the expected recuperation output being converted into a reduction of a current setpoint state of charge. Alternatively or additionally, it is possible to calculate an additional energy requirement of the vehicle based on an ascertained negative energy differential of the vehicle with respect to the destination, the calculated additional energy requirement being converted into an increase of a current setpoint state of charge.

Furthermore, it is possible to use an ECMS method based on a current setpoint state of charge in order to regulate the state of charge.

Furthermore, it is possible to determine the linear setpoint state of charge curve over a distance between the current position of the motor vehicle and the destination by calculating a linear curve of a setpoint state of charge with respect to the distance between the current position of the motor vehicle and the destination as a function of a state of charge at the current position of the motor vehicle and a specified discharge threshold value, which indicates a maximum admissible discharge.

This makes it possible to perform the method in a particularly robust manner. In particular, it is particularly well possible to implement a blended-mode strategy effectively and efficiently with the aid of the setpoint state of charge regulation of the ECMS and predictive information. Analyses of an ECMS operating strategy in diverse driving cycles have shown that it is possible to achieve the respectively best setpoint state of charge curve in most cases with high accuracy by correcting the linear setpoint state of charge curve by the remaining potential and kinetic energy of the motor vehicle with respect to the destination.

According to another aspect, a drive system is provided having an internal combustion engine, an electrical drive, which is supplied by an electrical energy store, and the above control unit.

Specific embodiments of the present invention are explained in greater detail below with reference to the enclosed drawings.

DETAILED DESCRIPTION

Figure 1:
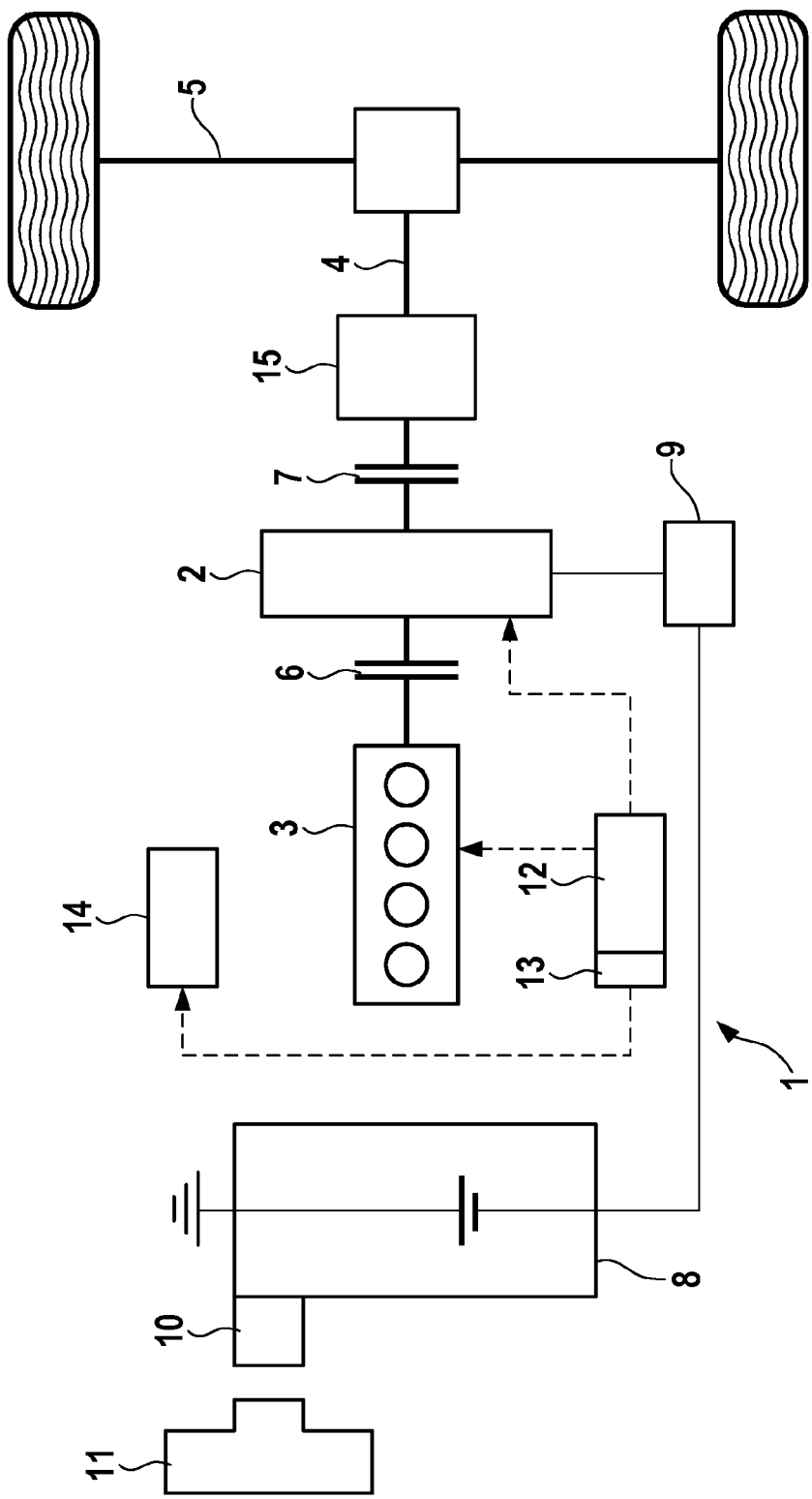
FIG. 1 shows a block diagram of a drive system for a plug-in hybrid electric vehicle (PHEV).

FIG. 1 shows a block diagram of a hybrid drive system 1 of a motor vehicle, in particular of a plug-in hybrid electric vehicle (PHEV). Drive system 1 has an electric drive 2 and an internal combustion engine 3, which provide required power onto drive axle 5 of drive system 1 via drive shaft 4. Alternatively, it is also conceivable that drive system 1 has multiple electric drives 2 for driving multiple drive axles 5. Furthermore, it is also possible for drive system 1 to be equipped with a four-wheel drive.

A first clutch 6 for opening and closing the drive train is situated between internal combustion engine 3 and electric drive 2. A first clutch 7 for opening and closing the drive train is situated between internal combustion engine 2 and electric drive 15. Electric drive 2 is supplied by an electrical energy store in the form of a battery 8, which is connected to electric drive 2 via a power electronics 9. The battery 8 may be a traction battery or a high-voltage battery for supplying electric drive 2 of drive system 1. Battery 8 is furthermore equipped with a charging terminal 10, to which an external current source 11 may be connected in order to charge battery 8.

Power electronics 9 is connected to the engine control or control unit 12 of drive system 1. Control unit 12 controls internal combustion engine 3 and electric drive 2 for providing partial drive torques. Control unit 12 furthermore has a prediction module 13, which is able to calculate a setpoint state of charge curve (SoC). The setpoint state of charge curve corresponds to a desired or specified curve of a state of charge of battery 8. Prediction module 13 or control unit 12 is connected to sensor unit 14 for ascertaining vehicle information or surroundings information.

Drive system 1 may be operated in different operating modes, in which respectively different portions of the total drive power are provided by electric drive 2 and by internal combustion engine 3 and the state of charge (SoC) of battery 8 is regulated in accordance with a specified strategy. The state of charge may be regulated by adapting an equivalence factor of a control strategy such as the ECMS (equivalent consumption minimization strategy).

Figure 2:
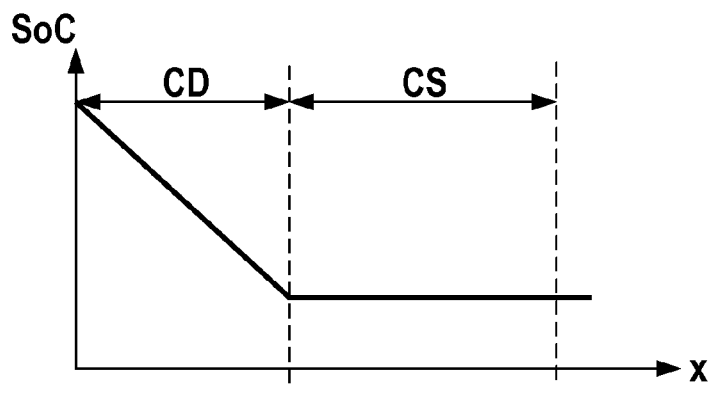
FIG. 2 shows a diagram of a curve of a state of charge (SoC) of a battery of a drive system that is operated in a charge-depletion/charge-sustaining mode.

FIG. 2 shows a state of charge curve according to a charge-depleting/charge-sustaining (CD/CS) strategy. For this purpose, the aim is to achieve the curve of the state of charge of battery 8 shown in FIG. 2 over the distance x traveled. Drive system 1 begins the drive with a charged battery 8, the vehicle driving purely electrically for as long as possible or the entire required power being provided by electric drive 2. This phase corresponds to the charge-depleting mode (CD mode). Only when a specified lower SoC threshold of the state of charge is reached is internal combustion engine 3 activated and the state of charge of battery 8 is regulated by discharge and charge cycles (using electrical energy generated in the motor vehicle) about the lower SoC threshold. Such a drive system is able to regulate the state of charge of battery 8 to a low level over the entire remaining time span. This makes it possible to implement the CD/CS strategy shown.

Figure 3:
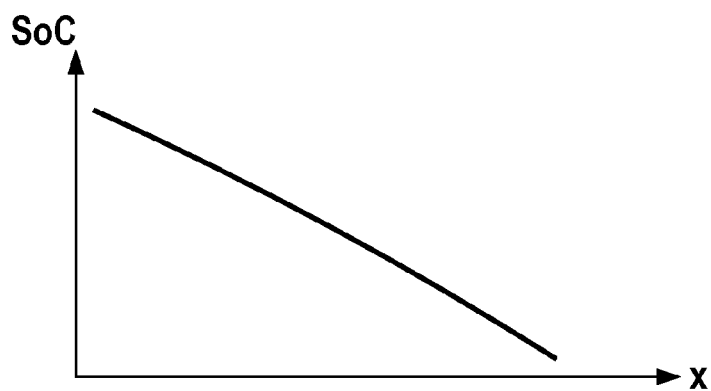
FIG. 3 shows a diagram of a curve of an SoC of a battery of a drive system that is operated in a mixed mode ("blended mode").

FIG. 3 shows a state of charge curve according to a strategy of a so-called "blended mode" over the distance x traveled. Drive system 1 is operated here in a blended mode, the required power during the entire operating time being provided partially by internal combustion engine 3 and partially by an electric drive 2 supplied from battery 8.

Compared to the CD/CS strategy from FIG. 2, it is possible to achieve an improvement of the $CO_2$ efficiency since the load distribution in the CD/CS strategy in real travel usually does not correspond to the optimal torque distribution of hybrid drive system 1. The blended-mode strategy approximates this optimal torque distribution much more closely.

Figure 4:
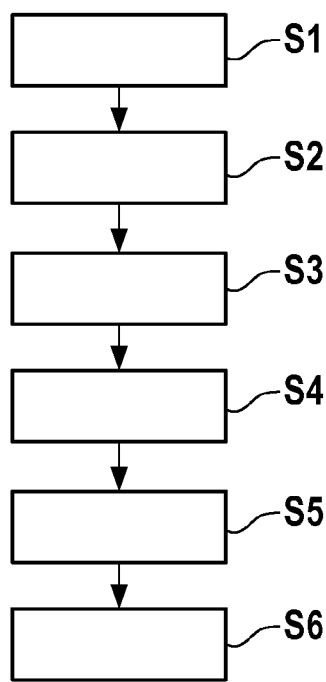
FIG. 4 shows a flow chart of a method for operating a drive system.

FIG. 4 shows a flow chart to illustrate a further method for operating a drive system:

In step S1, the drive system is provided at the beginning of a drive with a completely charged battery 8.

The method described below strives to discharge the battery as much as possible until the next charging opportunity is reached. In the process, battery 8 is discharged down to a specified discharge threshold value.

In step S2, current information about the current state of the drive system 1 or the motor vehicle is ascertained and transmitted to prediction module 13.

First, this information concerns the starting location as the current position of the motor vehicle and the location of the next possible charging opportunity as the destination, the length of the route between the starting location and the destination being determined in the process. Furthermore, the absolute elevation, especially the elevation above sea level, of the destination is determined and communicated to the prediction module 13. The necessary data may be provided for example by a navigation device used in the drive system 1, which is connected to the control unit of drive system 1.

According to the specific embodiment shown here, the navigation device detects or knows the probably next charging location of the vehicle and passes this on to prediction module 13 as the destination and/or the resulting remaining travel distance. Otherwise, the remaining travel distance is calculated to the destination entered into the navigation device. Prediction module 13 is also able to take into account in the calculation the return drive to the starting location. This is expedient, for example, when the driver has no charging opportunity at the destination of the drive, but charges the motor vehicle at the starting location.

In step S3, a linear setpoint curve of the state of charge is determined from predictive information, the linear curve between the starting location or the current position of motor vehicle 1 and the destination, i.e. the location of the charging opportunity, being calculated, a state of charge of a maximum (maximally admissible) discharge being specified for the destination, which may correspond e.g. to a discharge threshold value. In other words, the linear curve results from a setpoint state of charge that decreases in a linear manner over the distance to the destination.

The determined curve falls off in step S3 from a starting value, i.e. from the current state of charge down to a desired final state of charge or the specified discharge threshold value for the state of charge in a linear manner or in another manner that is simple to calculate. If the driver wishes to reach at the end of the drive a specific value for the state of charge of battery 8, it is possible for the prediction module 13 to set the setpoint state of charge in a linear manner to the desired target value and thus to apply an operating strategy that is lower in emissions and more comfortable or uniform than what is possible using strategies that change the setpoint state of charge immediately to the desired target value of the state of charge at the destination.

The linear curve of the setpoint state of charge may be calculated over the remaining distance to be traveled. The linearity of the setpoint state of charge over the travel distance may be chosen because the determination of the predictive information is in this case particularly simple and precise, and it is typically possible to determine the remaining distance to the charging location more precisely than the remaining travel time. According to one variant, it is also possible, however, to plot the linearity over time.

In step S4, the current values for additional predictive information, here: the current absolute elevation, at which the vehicle is located, and the driving speed, are ascertained and transmitted to prediction module 13.

It is characteristic for prediction module 13 that the setpoint state of charge curve is determined, not at the beginning of travel, but during travel for the respective current point in time. It is thus no longer necessary to determine many items of information predictively.

In step S5, the linear state of charge curve is modified by the additional predictive information determined in step S4.

In the process, the linear setpoint state of charge curve is corrected by the remaining potential and kinetic energy of the vehicle with respect to the destination. Aside from the remaining travel distance, the absolute elevation at the destination is used as predictive information.

For each point in time, the current driving speed and the current elevation of the vehicle are thus detected by vehicle sensors/navigation device and are transmitted to prediction module 13. There the potential and kinetic energy differential with respect to the destination is calculated. Furthermore, an expected recuperation energy to the destination is calculated with the aid of an estimated efficiency chain of the drive train and the battery system. This is converted into a reduction of the setpoint state of charge. A calculated negative potential energy (ascent) on the other hand is regarded as an additional energy requirement on battery 8, which, according to the present invention, also allows for an increase of the setpoint state of charge.

In step S6, a current setpoint state of charge at each point in time is transmitted to control unit 12. Control unit 12 performs an operating strategy method in which a torque distribution or load distribution is determined as a function of the current setpoint state of charge, e.g. according to an ECMS (equivalent consumption minimization strategy) that is known per se. The operating strategy in the motor vehicle then regulates the state of charge to the desired setpoint state of charge as target value.

Figure 5:
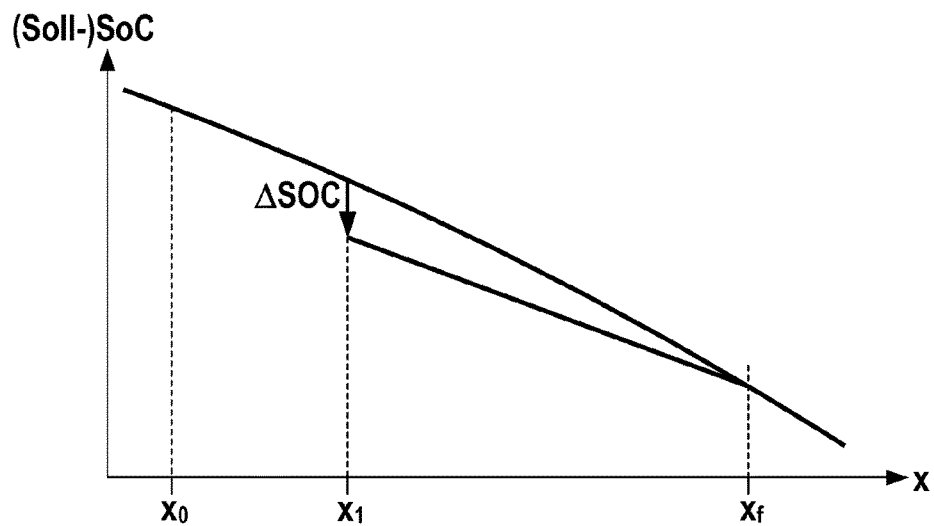
FIG. 5 shows a diagram of a curve of an SoC of a battery of a drive system that is operated in a blended mode.

FIG. 5 shows a diagram of a curve of a state of charge of a battery 8 of a drive system 1, which is operated in a blended mode and in accordance with the previously described method. In contrast to FIG. 3, in FIG. 5 updating the setpoint state of charge curve is additionally represented qualitatively. As shown in FIG. 5, the method initially begins with a linear curve, in which a linearly descending curve of the setpoint state of charge is assumed between starting location $X_0$ and destination $x_f$.

At location $x_1$, an exemplary updating of the linear curve is shown, in which the linear curve of control unit 12 is modified by a correction value $\Box$SOC. In the following, the setpoint state of charge is regulated to the new setpoint state of charge value, the curve of the setpoint state of charge now descending in a more gently inclined slope than would have originally been the case without the modification. Such a modification or update may be performed repeatedly or cyclically during the method.

Figure 6:
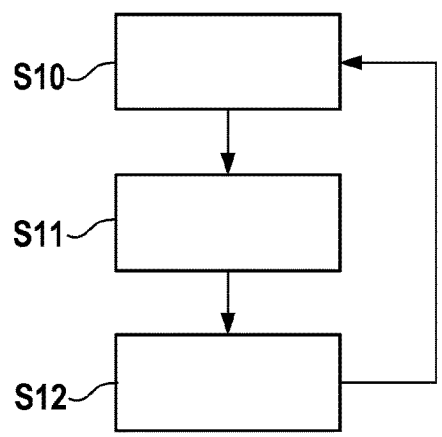
FIG. 6 shows a flow chart of a method for operating a drive system.

FIG. 6 shows a method for operating a vehicle, in particular a plug-in hybrid electric vehicle. First, the state of charge is regulated in step S10 in accordance with a specified curve of the setpoint state of charge. This occurs on the basis of an operating strategy method that is implemented in control unit 12.

In step S11, the at least one sensor unit ascertains information about a current state of the vehicle.

Finally, in step S12, the specified setpoint state of charge curve is updated in that this setpoint state of charge curve is modified based on the ascertained information. This may be achieved by a correction value $\Box$SOC, which is applied to the setpoint state of charge at location $x_1$, at which the vehicle is currently located. Subsequently, the method returns to step S10 in order to continue to regulate the setpoint state of charge curve for example using an ECMS method.

What is claimed is:

1. A method for operating a hybrid drive system for a motor vehicle having an internal combustion engine and an electrical drive, the method comprising:
   regulating a load distribution between the electrical drive, which is supplied by an electrical energy store, and the internal combustion engine based on a current setpoint state of charge of the electrical energy store, wherein required power of the internal combustion engine and/or of the electrical drive is set in accordance with a specified load distribution;
   determining the current setpoint state of charge from a specified setpoint state of charge curve between a current position of the motor vehicle and a destination;
   ascertaining information about a current state of the motor vehicle, and
   updating the specified setpoint state of charge curve as a function of the ascertained information;
   wherein the specified setpoint state of charge curve is a linear setpoint state of charge curve, and wherein the linear setpoint state of charge curve is determined over a distance between the current position of the motor vehicle and the destination by calculating a linear curve of the setpoint state of charge with respect to the distance between the current position of the motor vehicle and the destination as a function of a state of charge at the current position of the motor vehicle and a specified discharge threshold value, which indicates a maximum admissible discharge; and
   wherein the updating of the specified setpoint state of change curve provides an updated linear setpoint state of change curve over a remaining distance to the destination of the motor vehicle, and wherein the method further comprises:
   after the updating, determining a new current setpoint state of charge from the updated linear setpoint state of charge curve based on a new current position of the vehicle; and
   further regulating the load distribution between the electrical drive and the internal combustion engine based on the new current setpoint state of change.

2. The method of claim 1, further comprising:
   ascertaining an energy differential of the motor vehicle between the current position of the motor vehicle and the destination from the ascertained information,
   calculating a correction value for a current setpoint state of charge based on the ascertained energy differential; and
   applying the correction value on the current setpoint state of charge.

3. The method of claim 2, further comprising:
ascertaining a current driving speed and/or a current elevation coordinate of the vehicle and/or an absolute elevation at the destination, and
ascertaining the energy differential from a kinetic energy of the vehicle and/or a potential energy of the vehicle with respect to the destination.

4. The method of claim 2, further comprising:
calculating an expected recuperation energy based on an ascertained positive energy differential of the motor vehicle with respect to the destination, the expected recuperation power being converted into a reduction of a current setpoint state of charge, and/or
calculating an additional energy requirement of the motor vehicle based on an ascertained negative energy differential of the motor vehicle with respect to the destination, the calculated additional energy requirement being converted into an increase of a current setpoint state of charge.

5. The method of claim 1, wherein an equivalent consumption minimization strategy ("ECMS") process based on a current setpoint state of charge is used to regulate the state of charge.

6. The method of claim 1, wherein the method is repeated cyclically.

7. A control unit for operating a hybrid drive system for a motor vehicle having an internal combustion engine and an electrical drive, comprising:
a control device configured to perform the following:
regulating the load distribution between the electrical drive, which is supplied by an electrical energy store, and the internal combustion engine based on a current setpoint state of charge of the electrical energy store, wherein required powers of the internal combustion engine and/or of the electrical drive are set in accordance with a specified load distribution;
determining the current setpoint state of charge from a specified setpoint state of charge curve between a current position of the motor vehicle and a destination;
ascertaining information about a current state of the motor vehicle, and
updating the specified setpoint state of charge curve as a function of the ascertained information;
wherein the specified setpoint state of charge curve is a linear setpoint state of charge curve, and wherein the linear setpoint state of charge curve is determined over a distance between the current position of the motor vehicle and the destination by calculating a linear curve of the setpoint state of charge with respect to the distance between the current position of the motor vehicle and the destination as a function of a state of charge at the current position of the motor vehicle and a specified discharge threshold value, which indicates a maximum admissible discharge; and
wherein the updating of the specified setpoint state of change curve provides an updated linear setpoint state of change curve over a remaining distance to the destination of the motor vehicle, and wherein the control device is further configured to perform the following:
after the updating, determining a new current setpoint state of charge from the updated linear setpoint state of charge curve based on a new current position of the vehicle; and
further regulating the load distribution between the electrical drive and the internal combustion engine based on the new current setpoint state of change.

8. A non-transitory computer readable medium having a computer program, which is executable by a processor, comprising:
a program code arrangement having program code for operating a hybrid drive system for a motor vehicle having an internal combustion engine and an electrical drive, by performing the following:
regulating a load distribution between the electrical drive, which is supplied by an electrical energy store, and the internal combustion engine based on a current setpoint state of charge of the electrical energy store, wherein required power of the internal combustion engine and/or of the electrical drive is set in accordance with a specified load distribution; and
determining the current setpoint state of charge from a specified setpoint state of charge curve between a current position of the motor vehicle and a destination;
ascertaining information about a current state of the motor vehicle, and
updating the specified setpoint state of charge curve as a function of the ascertained information;
wherein the specified setpoint state of charge curve is a linear setpoint state of charge curve, and wherein the linear setpoint state of charge curve is determined over a distance between the current position of the motor vehicle and the destination by calculating a linear curve of the setpoint state of charge with respect to the distance between the current position of the motor vehicle and the destination as a function of a state of charge at the current position of the motor vehicle and a specified discharge threshold value, which indicates a maximum admissible discharge; and
wherein the updating of the specified setpoint state of change curve provides an updated linear setpoint state of change curve over a remaining distance to the destination of the motor vehicle, and wherein the program code arrangement further performs the following:
after the updating, determining a new current setpoint state of charge from the updated linear setpoint state of charge curve based on a new current position of the vehicle; and
further regulating the load distribution between the electrical drive and the internal combustion engine based on the new current setpoint state of change.

9. The method as recited in claim 1, wherein the information about the current state of the motor vehicle includes a current driving speed of the motor vehicle, and a current absolute elevation at which the motor vehicle is located.

10. The method as recited in claim 1, wherein the ascertaining, the updating, the determining of the new current setpoint state of charge, and the further regulating, are performed repeatedly during travel of the motor vehicle from the current positon of the motor vehicle to the destination of the motor vehicle.

11. The method as recited in claim 1, wherein the linear setpoint state of charge curve linearly decreases over the entire distance from the current positon of the motor vehicle to the destination of the motor vehicle.

12. The method as recited in claim 11, wherein the hybrid drive system is operated in a blended mode over the entire distance from the current position of the motor vehicle to the destination of the motor vehicle, the blended mode being a mode in which the required power is provided partially by the internal combustion engine and partially by the electric drive.

13. A drive system, comprising:
an internal combustion engine;
an electrical drive, which is supplied by an electrical energy store; and
a control unit for operating a hybrid drive system for a motor vehicle having an internal combustion engine and an electrical drive, including:
a control device configured to perform the following:
regulating the load distribution between the electrical drive, which is supplied by an electrical energy store, and the internal combustion engine based on a current setpoint state of charge of the electrical energy store, wherein required powers of the internal combustion engine and/or of the electrical drive are set in accordance with a specified load distribution;
determining the current setpoint state of charge from a specified setpoint state of charge curve between a current position of the motor vehicle and a destination;
ascertaining information about a current state of the motor vehicle, and
updating the specified setpoint state of charge curve as a function of the ascertained information;
wherein:
the specified setpoint state of charge curve is a linear setpoint state of charge curve, and wherein the linear setpoint state of charge curve is determined over a distance between the current position of the motor vehicle and the destination by calculating a linear curve of the setpoint state of charge with respect to the distance between the current position of the motor vehicle and the destination as a function of a state of charge at the current position of the motor vehicle and a specified discharge threshold value, which indicates a maximum admissible discharge;
the updating of the specified setpoint state of change curve provides an updated linear setpoint state of change curve over a remaining distance to the destination of the motor vehicle, and
the control unit is further configured to perform:
after the updating, determining a new current setpoint state of charge from the updated linear setpoint state of charge curve based on a new current position of the vehicle; and
further regulating the load distribution between the electrical drive and the internal combustion engine based on the new current setpoint state of change.

14. The drive system as recited in claim 13, wherein the information about the current state of the motor vehicle includes a current driving speed of the motor vehicle, and a current absolute elevation at which the motor vehicle is located.

15. The drive system is recited in claim 13, wherein the ascertaining, the updating, the determining of the new current setpoint state of charge, and the further regulating, are performed repeatedly during travel of the motor vehicle from the current position of the motor vehicle to the destination of the motor vehicle.

* * * * *